US008345296B2

(12) United States Patent
Miyajima

(10) Patent No.: US 8,345,296 B2
(45) Date of Patent: Jan. 1, 2013

(54) IMAGE PROCESSING APPARATUS FOR DETERMINING APPROPRIATENESS OF COMBINATION OF CONTROL SOFTWARE, ACTIVATION METHOD, AND STORAGE MEDIUM STORING CONTROL PROGRAM THAT CAUSES COMPUTER TO PERFORM THE METHOD

(75) Inventor: Jun Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1050 days.

(21) Appl. No.: 12/257,639

(22) Filed: Oct. 24, 2008

(65) Prior Publication Data

US 2009/0116067 A1    May 7, 2009

(30) Foreign Application Priority Data

Oct. 26, 2007    (JP) .................................. 2007-279399

(51) Int. Cl.
 *G06K 15/00*    (2006.01)
 *G03G 15/00*    (2006.01)
 *G06F 15/173*    (2006.01)

(52) U.S. Cl. ...................... 358/1.16; 358/1.12; 358/1.13; 358/1.15; 358/1.17; 358/1.18; 358/1.9; 358/426.12; 358/426.15; 358/426.16; 358/296; 399/8; 399/9; 399/11; 399/12; 399/13; 399/16; 399/31; 399/38; 399/76; 399/82; 709/201; 709/203; 709/218; 709/221; 709/223; 709/224

(58) Field of Classification Search ........................ None
See application file for complete search history.

(56) References Cited

U.S. PATENT DOCUMENTS

| | | | | |
|---|---|---|---|---|
| 6,662,363 B1 * | 12/2003 | Miyamoto | ..................... | 717/174 |
| 7,814,480 B2 * | 10/2010 | Sakuda et al. | ................ | 717/173 |
| 2001/0027517 A1 | 10/2001 | Kato | | |
| 2004/0187025 A1 * | 9/2004 | Tachiyama | ..................... | 713/201 |
| 2006/0244986 A1 * | 11/2006 | Ferlitsch | ...................... | 358/1.13 |
| 2007/0169104 A1 * | 7/2007 | Morita | ......................... | 717/170 |

FOREIGN PATENT DOCUMENTS

| | | |
|---|---|---|
| JP | 2000-259398 A | 9/2000 |
| JP | 2001-216167 | 8/2001 |
| JP | 2005-182740 A | 7/2005 |

* cited by examiner

*Primary Examiner* — Steven Kau
(74) *Attorney, Agent, or Firm* — Canon U.S.A., Inc., IP Division

(57) ABSTRACT

An image processing apparatus includes an apparatus main unit control software storage unit configured to store new apparatus main unit control software used to control a main unit of the image processing apparatus on a non-volatile storage device, a combination appropriateness determination unit configured to determine whether a combination of the new apparatus main unit control software and post-processing apparatus control software that currently operates on a post-processing apparatus is appropriate based on version information about the post-processing apparatus control software used to control the post-processing apparatus, which is operable in combination with the new apparatus main unit control software, and version information about the post-processing apparatus control software that currently operates on the post-processing apparatus, a determination result storage unit configured to store a result of the determination by the combination appropriateness determination unit, and an activation unit configured to activate the apparatus main unit control software according to the determination result.

14 Claims, 9 Drawing Sheets

ERROR!
THE COMBINATION OF APPARATUS CONTROLLER AND FINISHER IS NOT APPROPRIATE.
PLEASE UPDATE VERSION OF SOFTWARE TO APPLY AN APPROPRIATE COMBINATION OR REMOVE THE FINISHER AND RESTART APPARATUS.

VERSION OF FINISHER HAS BEEN UPGRADED. PLEASE RESTART APPARATUS.

IMAGE PROCESSING APPARATUS FOR DETERMINING APPROPRIATENESS OF COMBINATION OF CONTROL SOFTWARE, ACTIVATION METHOD, AND STORAGE MEDIUM STORING CONTROL PROGRAM THAT CAUSES COMPUTER TO PERFORM THE METHOD

BACKGROUND OF THE INVENTION

1. Field of the Invention

The present invention generally relates to an image processing apparatus, an activation method, and a storage medium storing a control program that causes a computer to perform the method.

2. Description of the Related Art

In a conventional copying machine or a printing apparatus, a system may be made up of a combination of a plurality of control programs. For example, in the case of a copying machine, the entire system may be made up of a program for controlling a post-processing apparatus such as a finisher that performs stapling or shift sorting, in addition to a program for controlling a main unit of the apparatus.

With respect to an apparatus thus operated by a plurality of control programs, it may be necessary to use the plurality of programs in an appropriate combination.

For example, a post-processing apparatus control program ver. 1.0 may be capable of operating on an apparatus main unit control program ver. 10.0. On the contrary, the post-processing apparatus control program ver. 1.0 may not be capable of operating on an apparatus main unit control program ver. 11.0 but a post-processing apparatus control program ver. 2.0 may be capable of normally operating on the apparatus main unit control program ver. 11.0.

Accordingly, it may be necessary to write and store various control programs on a read-only memory (ROM) with an appropriate combination thereof before shipping an image forming apparatus installed with the control programs from a factory.

On the other hand, in the case of a conventional image forming apparatus such as a copying machine or a printing apparatus, control software is often stored in a rewritable area such as a flash memory or a hard disk so that the control software can be upgraded to its latest version after the image forming apparatus is shipped from a factory. Thus, such a conventional copying machine and a printing apparatus may be capable of responding to the demand of the market.

As a consequence, the combination of control software, which is appropriate at the time of shipment from a factory, may become inappropriate later due to a release of a latest version thereof after the shipment.

Japanese Patent Application Laid-Open No. 2001-216167 discusses a system that upgrades a control software after checking whether the control software programs to be upgraded can be installed on the apparatus with an appropriate combination.

SUMMARY OF THE INVENTION

The present invention is directed to an image processing apparatus and an activation method for activating a control program used in the image processing apparatus configured to activate an appropriate version of apparatus main unit control software programs with an appropriate combination thereof.

According to an aspect of the present invention, an image processing apparatus includes an apparatus main unit control software storage unit configured to store new apparatus main unit control software used to control a main unit of the image processing apparatus on a non-volatile storage device. The image processing apparatus also includes a combination appropriateness determination unit configured to determine whether a combination of the new apparatus main unit control software and post-processing apparatus control software that currently operates on a post-processing apparatus is appropriate based on version information about the post-processing apparatus control software used to control the post-processing apparatus, which is operable in combination with the new apparatus main unit control software, and version information about the post-processing apparatus control software that currently operates on the post-processing apparatus. The image processing apparatus further includes a determination result storage unit configured to store a result of the determination by the combination appropriateness determination unit on a non-volatile storage device. The image processing apparatus also includes an activation unit configured to activate the apparatus main unit control software according to the determination result stored on the non-volatile storage device after receiving an activation request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain aspects of the principles of the present invention.

FIG. 6 illustrates an example of an error message display screen according to an exemplary embodiment of the present invention.

FIG. 7 illustrates an example of a restart prompting screen according to an exemplary embodiment of the present invention.

DETAILED DESCRIPTION OF THE EMBODIMENTS

Various exemplary embodiments, features, and aspects of the present invention will now be herein described in detail below with reference to the drawings. It should be noted that the relative arrangement of the components, the numerical expressions, and numerical values set forth in these embodiments are not intended to limit the scope of the present invention.

Figure 1:
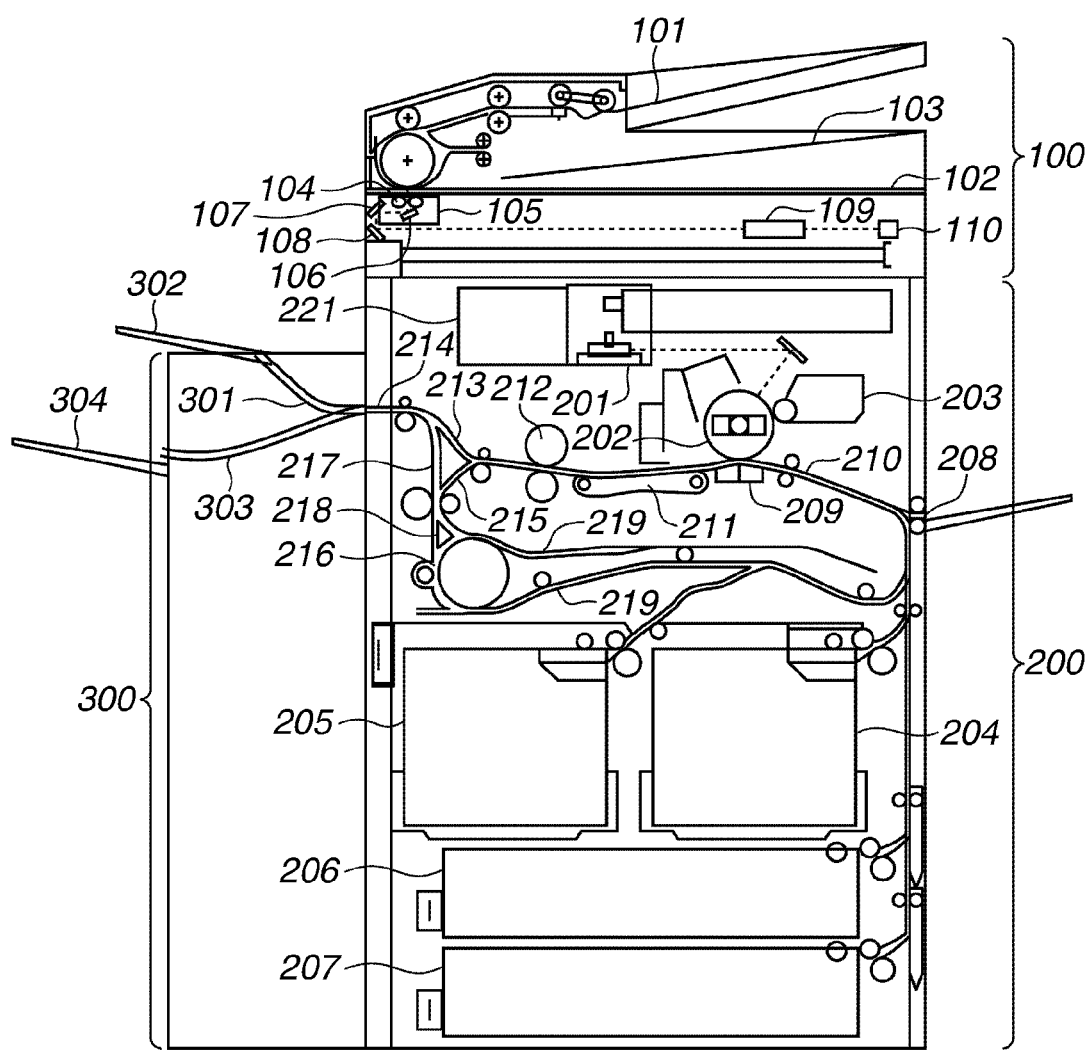
FIG. 1 is a cross section that illustrates an exemplary configuration of components of a post-processing apparatus for a scanner unit and a printer unit of an image forming apparatus (image processing apparatus) according to an exemplary embodiment of the present invention.

A first exemplary embodiment of the present invention is described below. FIG. 1 is a cross section that illustrates an exemplary configuration of components of a post-processing apparatus 300 for a scanner unit 100 and a printer unit 200 of an image forming apparatus according to the present exemplary embodiment. In the present exemplary embodiment, a multifunction peripheral (MFP) having the following configuration is described as an example of the image processing apparatus. As an example of the image processing apparatus, a scanner, a facsimile, a printer, or an MFP having functions of these apparatuses are used.

According to one embodiment, a document feeding unit 101 of the scanner unit 100 feeds a document onto a platen glass 102 sheet by sheet starting from a first page of a stack of the document. Furthermore, the document feeding unit 101 discharges the document from the platen glass 102 onto a discharge tray 103 after an image of the document has been completely read by the scanner unit 100.

After the document has been conveyed onto the platen glass 102, the scanner unit 100 turns on an illumination lamp 104 and causes an optical unit 105 to start moving. Thus, the document is exposed and scanned.

A light reflected from the document is then guided into a charge-coupled device (CCD) image sensor (hereinafter simple referred to as a "CCD") 110 via mirrors 106, 107, and 108 and a lens 109. Thus, the scanned image of the document may be read by the CCD 110.

Image data output from the CCD 110 may then subjected to image processing by the scanner unit 100 before being transferred to the printer unit 200.

A laser driver 221 of the printer unit 200 drives a laser emission unit 201. The laser driver 221 causes the laser emission unit 201 to emit a light beam according to the image data output from an image forming apparatus control unit, which will be described in detail below.

A photosensitive drum 202 is irradiated with the laser beam to form a latent image according to the laser beam on the photosensitive drum 202. A development device 203 causes a developer to adhere to a portion of the photosensitive drum 202 in which the latent image is formed.

The printer unit 200 includes paper stacking units such as a cassette 204, a cassette 205, a cassette 206, a cassette 207 that are each respectively formed of a drawer, and a manual feeding tray 208. The manual feeding tray 208 is connected to the apparatus in an externally protruded manner. To replenish a recording paper, a user draws the cassette out of the apparatus, replenishes the cassette with recording paper sheets, and inserts the cassette into the apparatus, except when the manual feeding tray 208 is used.

In synchronization with the start of the irradiation of the laser beam, the recording paper is fed from either of the cassette 204, the cassette 205, the cassette 206, the cassette 207, or the manual feeding tray 208. The recording paper fed in this manner is then conveyed to a transfer unit 209 via a conveyance path 210. Then, a developer that adheres to the photosensitive drum 202 is transferred by the transfer unit 209 onto the recording paper.

The recording paper having the developer is then conveyed to a fixing unit 212 via a conveyor belt 211. The recording paper then has applied thereto heat and pressure by the fixing unit 212. Thus, the developer on the recording paper is fixed thereon. Then, after passing through the fixing unit 212, the recording paper is discharged via conveyance paths 213 and 214.

On the other hand, in the case where the recording paper is reversed to be discharged, the recording paper is guided to conveyance paths 215 and 216. Then, the recording paper is conveyed in a reverse direction to pass through conveyance path 217 and 214.

Furthermore, in the case where two-sided recording (printing) has been set, the recording paper is guided into a re-feed conveyance path 219 by a flapper 218 from the conveyance path 215 after passing through the fixing unit 212. Then, the recording paper is conveyed in a reverse direction and guided by the flapper 218 again into the re-feed conveyance path 219 from the conveyance path 216.

The recording paper which has been guided into the re-feed conveyance path 219 then passes through the conveyance path 210 at the above-described timing and is then conveyed to the transfer unit 209. Then, after being discharged from the conveyance path 214, the recording paper is conveyed to the post-processing apparatus 300.

The post-processing apparatus 300 includes a path for outputting the recording paper that has been discharged from the conveyance path 214 of the printer unit 200 onto an escape tray (a discharge bin) 302 via a conveyance path 301. In addition, the post-processing apparatus 300 includes a path for outputting the recording paper discharged from the conveyance path 214 onto a main tray (another discharge bin) 304 via a conveyance path 303. In one embodiment of normal processing, the recording paper sheets are stacked in the discharge bin 304, which is the main tray.

On the other hand, the recording paper may be output onto the discharge bin 302, which is the escape tray, if any recording paper sheet is to be stacked separately from those stacked on the main tray.

For example, as a general application, an output result of copy processing can be output onto the main tray while an output result of facsimile processing can be output onto the escape tray. The post-processing apparatus 300 is controlled by a post-processing apparatus control unit, which will be described in detail below.

Figure 2:
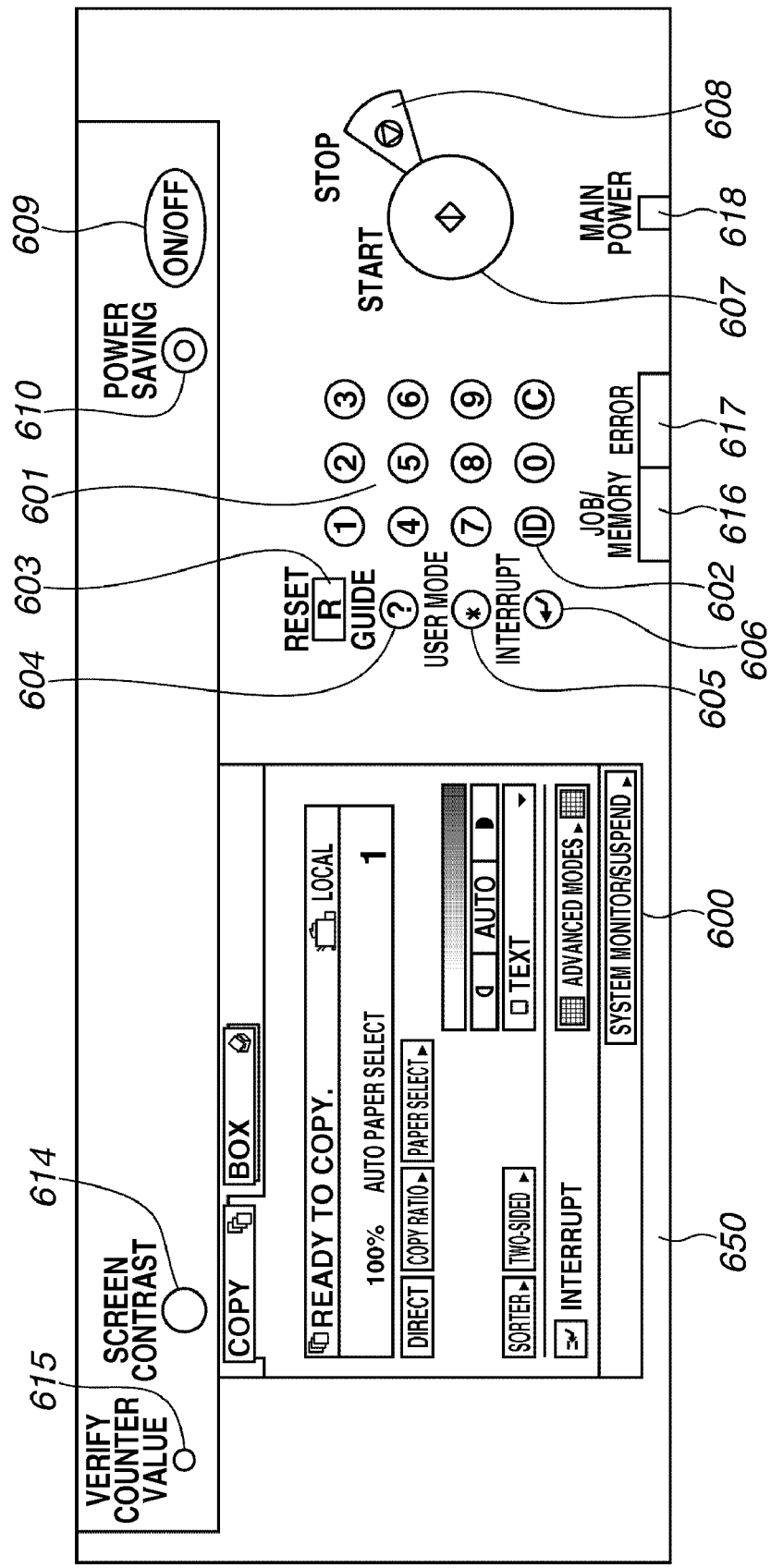
FIG. 2 illustrates an example of an operation unit according to an exemplary embodiment of the present invention.

Now, an operation unit 650 is described with reference to FIG. 2. FIG. 2 illustrates an example of the operation unit 650.

Referring to FIG. 2, the operation unit 650 includes a liquid crystal display (LCD) touch panel 600. A user performs a primary mode setting via the LCD touch panel 600. Furthermore, the LCD touch panel 600 displays status information about the apparatus.

Numeral keys 601 can be operated by the user to enter numerical values of 0 through 9. An ID key 602 can be operated by the user to enter a corporation or organization division number and an encryption mode in the case where the apparatus is managed based on a division of a corporation or an organization.

A reset key 603 can be operated by the user to reset the mode that has been set. A guide key 604 can be operated by the user to display a guide screen for each mode.

A user mode key 605 can be operated by the user to change the display to a user mode screen. An interrupt key 606 can be operated by the user to perform an interrupt copy.

A start key 607 can be operated by the user to start a copy operation. A stop key 608 can be operated by the user to stop a copy job that is currently performed.

Furthermore, the operation unit 650 can include a soft power switch SW 609. When the user presses the soft power switch SW 609, a backlight of the LCD 600 is turned off and the image forming apparatus shifts to a low power consumption mode.

Furthermore, the operation unit 650 can include a power saving key 610. When the user presses the power saving key 610, the image forming apparatus shifts to a power saving mode. When the user presses the power saving key 610 again in this state, the image forming apparatus is restored from the power saving mode.

An adjust key 614 can be operated by the user to adjust a contrast of the LCD touch panel 600.

In addition, the operation unit 650 can include a "verify counter value" key 615. When the user presses the "verify counter value" key 615, a counter screen is displayed on the LCD 600 that displays a total number of sheets used in copy operations that have been performed thus far.

Furthermore, the operation unit 650 can include a light-emitting diode (LED) 616. The LED 616 indicates that the image data is being accumulated on an image memory during a job.

An error LED 617 can be provided to indicate that an error such as paper jamming or left-open cover has occurred with respect to the apparatus. A power indicating LED 618 may indicate a status of a main power of the image forming apparatus. When the power indicating LED 618 is on, it indicates that the image forming apparatus is powered on.

Figure 3:
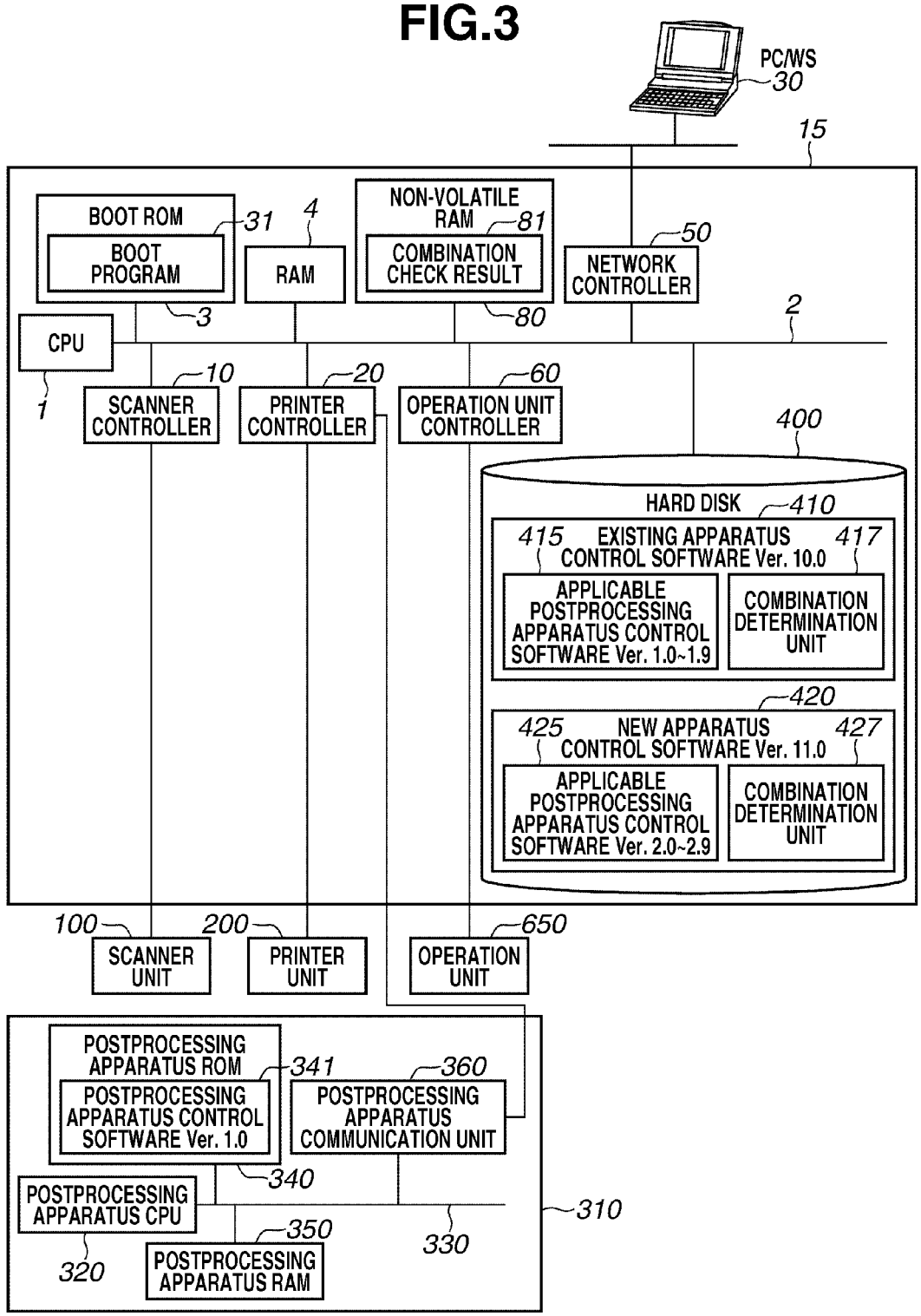
FIG. 3 illustrates an exemplary configuration of an image forming apparatus control unit and a post-processing apparatus control unit according to an exemplary embodiment of the present invention.

FIG. 3 illustrates an exemplary configuration of an image forming apparatus control unit 15 and a post-processing apparatus control unit 310 according to the present exemplary embodiment. Here, the image forming apparatus control unit 15 controls a main unit of the image forming apparatus. The post-processing apparatus control unit 310 controls the post-processing apparatus.

Referring to FIG. 3, in one embodiment the image forming apparatus control unit 15 includes a CPU 1, a boot ROM 3, a random access memory (RAM) 4, a non-volatile RAM 80, a network controller 50, a scanner controller 10, a printer controller 20, an operation unit controller 60, and a hard disk drive (HDD) 400. The above-described components of the image forming apparatus control unit 15 may be in communication with one another via a system bus 2.

The CPU 1 controls an operation of the entire image forming apparatus control unit 15. The CPU 1 operates according to a boot program 31 loaded from the boot ROM 3.

The RAM 4 is used as a work area and image data temporary storage area for the CPU 1. The non-volatile RAM 80 stores an input value even after the image forming apparatus has been powered off. Accordingly, the non-volatile RAM 80 stores a setting value which can be saved after powering off the image forming apparatus.

The network controller 50 is a controller for controlling a network and is connected to an external network. An external computer such as a personal computer (PC) or a workstation (WS) 30 may be connected to the image forming apparatus via the external network. Thus, an image forming apparatus main unit 150 can perform data communication with the PC/WS 30.

The scanner controller 10 is connected to the scanner unit 100. Further, the scanner controller 10 is connected to the CPU 1 via the system bus 2.

The scanner controller 10 includes a function for performing optimum binarization processing on the image received from the scanner unit 100 depending on a content of processing to be performed thereafter. Furthermore, the scanner controller 10 includes a function for performing magnification processing in a main scanning direction or in a sub scanning direction. In addition, the scanner controller 10 includes a function for outputting a control signal that has been generated based on a video control signal from the scanner unit 100 to the system bus 2.

The printer controller 20 is connected to the printer unit 200. Further, the printer controller 20 is connected to the CPU 1 via the system bus 2. The printer controller 20 includes a function for performing smoothing processing on the image data output from the CPU 1 and outputting the smoothed image data to the printer unit 200. In addition, the printer controller 20 includes a function for outputting a control signal generated based on a video control signal from the printer unit 200 to the system bus 2.

Moreover, the printer controller 20 is connected to the post-processing apparatus control unit 310. The post-processing apparatus control unit 310 controls the post-processing apparatus 300, for example, according to an instruction from the CPU 1.

The post-processing apparatus control unit 310 includes a post-processing apparatus CPU 320, a post-processing apparatus system bus 330, a post-processing apparatus ROM 340, a post-processing apparatus RAM 350, and a post-processing apparatus communication unit 360.

The post-processing apparatus CPU 320 controls an operation of the entire post-processing apparatus control unit 310. The post-processing apparatus CPU 320 operates according to a program loaded from the post-processing apparatus ROM 340. The post-processing apparatus RAM 350 is used as a work area for the post-processing apparatus CPU 320 to perform an operation.

The post-processing apparatus communication unit 360 is connected to the printer unit 200 of the image forming apparatus control unit 15 to perform communication processing.

The operation unit controller 60 of the image forming apparatus control unit 15 is connected to the operation unit 650. The operation unit 650 may include an LCD unit, a touch-panel input device provided on the LCD unit, and a plurality of hard keys.

A signal input by the user via the touch panel or the hard keys is transmitted to the CPU 1 via the operation unit controller 60. The LCD unit displays image data sent from the operation unit controller 60. On the LCD unit, a function to be executed by operating the image forming apparatus and image data are displayed.

A program and image data can be written on and loaded from the HDD 400.

Now, processing for activating the image forming apparatus control unit 15 will be described below. At the start of the processing, when the image forming apparatus control unit 15 is powered on, the CPU 1 loads and executes the boot program 31 from the boot ROM 3.

The boot ROM 3 has a limited and relatively small capacity. Accordingly, the boot ROM 3 cannot hold many multiple function programs. Accordingly, the control over the scanner controller 10, the printer controller 20, the network controller 50, and the operation unit controller 60 is performed by the apparatus main unit control software, which is stored on the HDD 400.

Note that the apparatus main unit control software is software for controlling the main unit of the image forming apparatus (the main unit of the image processing apparatus). The boot program 31 performs only minimum processing that may be necessary such as processing for activating the appropriate main unit control software stored on the HDD 400. Thus, the size of the program to be stored on the boot program 31 can be reduced.

The boot program 31, which may have a limited capacity, can load data and information stored on the non-volatile RAM 80 but may not be able to initialize the printer controller 20 to communicate with the post-processing apparatus control unit 310. The processing for initializing the printer controller 20 to communicate with the post-processing apparatus control unit 310 and perform the control thereof may be performed by the apparatus main unit control software stored on the HDD 400.

The HDD 400 can store a plurality of apparatus main unit control software. In the example illustrated in FIG. 3, existing apparatus main unit control software 410 and new apparatus main unit control software 420 is stored on the HDD 400. Each of the existing apparatus main unit control software 410 and the new apparatus main unit control software 420 has its version. More specifically, in the present exemplary embodiment, the version of the existing apparatus main unit control software 410 is ver. 10.0, while the version of the new apparatus main unit control software 420 is ver. 11.0.

Each of the existing apparatus main unit control software 410 and 420 has a predetermined version of the post-processing apparatus control software applicable thereto (operable as a combination).

For example, the version of post-processing apparatus control software 415 applicable to the existing apparatus main unit control software ver. 10.0 (the existing apparatus main unit control software 410) is versions 1.0 from 1.9 (415). On the other hand, the version of post-processing apparatus control software 425 applicable to the new apparatus main unit control software ver. 11.0 (the new apparatus main unit control software 420) is versions 2.0 from 2.9 (425) in the present exemplary embodiment.

A combination appropriateness determination unit 417 of the apparatus main unit control software compares the version (version information) of the post-processing apparatus control software to which the apparatus main unit control software stored within the HDD 400 can be applied with a post-processing apparatus control software version 341 stored in the post-processing apparatus control unit 310.

The combination appropriateness determination unit 417 writes a result of the comparison (a combination check result 81) on the non-volatile RAM 80. The post-processing apparatus control software version 341 is stored on the post-processing apparatus ROM 340.

The boot program 31 stored on the boot ROM 3 selects one apparatus main unit control software from among a plurality of apparatus main unit control software programs stored on the HDD 400 according to a content of the combination check result 81 stored on the non-volatile RAM 80. Then, the boot program 31 activates the selected apparatus main unit control software.

Figure 4:
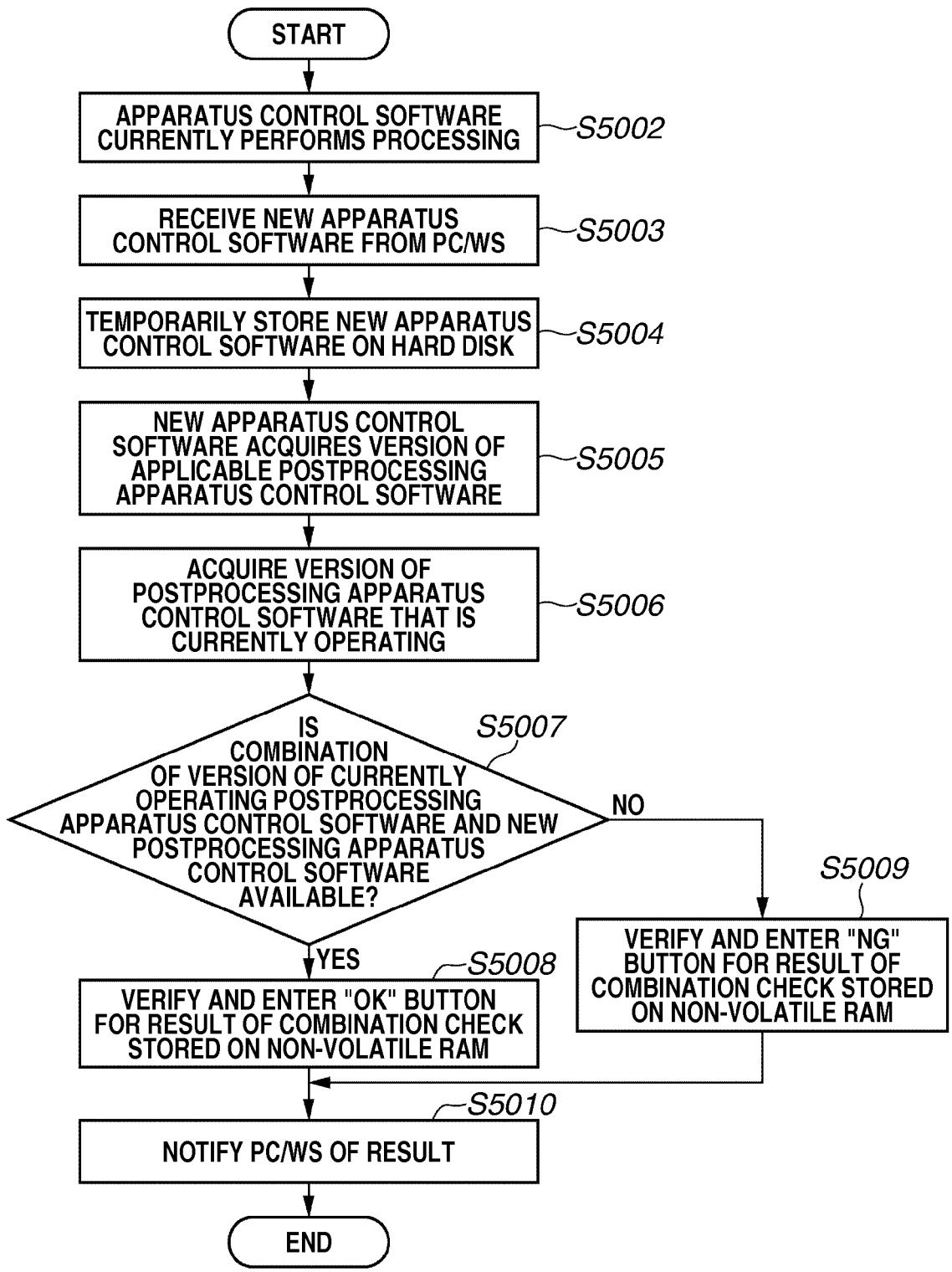
FIG. 4 is a flow chart that illustrates an example of control processing performed by a central processing unit (CPU) of the image forming apparatus control unit according to an exemplary embodiment of the present invention.

FIG. 4 is a flow chart that illustrates an example of control processing performed by the CPU 1 of the image forming apparatus control unit 15 according to the first exemplary embodiment. The control processing illustrated in FIG. 4 may be performed when new apparatus main unit control software is transferred from the PC/WS 30 while current apparatus main unit control software is being executed.

Referring to FIG. 4, in step S5002, the existing apparatus main unit control software ver. 10.0 (the apparatus main unit control software 410) (FIG. 3) operates on the CPU 1. That is, the CPU 1 currently performs processing according to the existing apparatus main unit control software ver. 10.0 (the apparatus main unit control software 410). The apparatus main unit control software controls the network controller 50 and the printer controller 20. Further, the apparatus main unit control software can communicate with the PC/WS 30 and the post-processing apparatus control unit 310.

In step S5003, the CPU 1 receives new apparatus main unit control software from the PC/WS 30.

In step S5004, the CPU 1 stores the new apparatus main unit control software received in step S5003 on the HDD 400 (performs apparatus main unit control software storage processing). In the example illustrated in FIG. 3, the new apparatus main unit control software is stored on the HDD 400 as the new apparatus main unit control software ver. 11.0 (the new apparatus main unit control software 420).

In step S5005, the CPU 1 acquires the version of the post-processing apparatus control software applicable to the new apparatus main unit control software ver. 11.0 (the new apparatus main unit control software 420) stored in step S5004 from the new apparatus main unit control software ver. 11.0 (the new apparatus main unit control software 420). In the example illustrated in FIG. 3, versions from ver. 2.0 to ver. 2.9 are the applicable post-processing apparatus control software versions 425.

In step S5006, the CPU 1 communicates with the post-processing apparatus control unit 310 via the printer controller 20 and acquires the currently operating version of post-processing apparatus control software 341 stored on the post-processing apparatus ROM 340. In the example illustrated in FIG. 3, the currently operating version of post-processing apparatus control software 341 is version 1.0.

In step S5007, the CPU 1 determines whether the combination is appropriate based on the version of the post-processing apparatus control software, which has been acquired in step S5006, and the version of the post-processing apparatus control software to which the new apparatus main unit control software can be applied, which has been acquired in step S5005.

The determination (check) is performed by the combination appropriateness determination unit 417 of the apparatus main unit control software. If it is determined in step S5007 that the combination of the new apparatus main unit control software and the post-processing apparatus control software is appropriate (YES in step S5007), then the CPU 1 advances to step S5008. On the other hand, if it is determined in step S5007 that the combination of the new apparatus main unit control software and the post-processing apparatus control software is not appropriate (NO in step S5007), then the CPU 1 advances to step S5009.

In the case where the processing advances to step S5008, the CPU 1 has verified in step S5007 that the combination of the new apparatus main unit control software and the post-processing apparatus control software is appropriate as described above.

Accordingly, in step S5008, the CPU 1 sets a parameter "OK" to the content of the combination check result 81 stored on the non-volatile RAM 80 of the image forming apparatus control unit 15. The processing is an example of determination result storage processing.

In the case where the processing advances to step S5009, the CPU 1 has recognized in step S5007 that the combination of the new apparatus main unit control software and the post-processing apparatus control software is not appropriate.

Accordingly, in step S5009, the CPU 1 sets a parameter "NG" to the content of the combination check result 81 stored on the non-volatile RAM 80 of the image forming apparatus control unit 15. The processing is an example of the determination result storage processing.

In step S5010, the CPU 1 notifies the PC/WS 30 of a result of the transfer (the combination check result 81) of the new apparatus main unit control software via the network controller 50. Then, the CPU 1 ends the processing illustrated in FIG. 5 and continues the operation of the existing apparatus main unit control software.

After having received the transfer result, the PC/WS 30 displays the received result of the latest transfer of the new apparatus main unit control software on a screen of the PC/WS 30. For example, if it is determined in step S5007 that the combination of the new apparatus main unit control software and the post-processing apparatus control software is not appropriate (NO in step S5007), then the PC/WS 30 displays a screen for prompting the user to replace the post-processing apparatus ROM 340 with a new one.

Otherwise, it is also useful if the PC/WS 30 notifies the transfer result to another PC/WS 30. In this case, for example, an e-mail address of a notification destination is previously registered on the PC/WS 30. The PC/WS 30 can transfer the result of the transfer of the new apparatus main unit control software to the registered notification destination e-mail address.

Figure 5:
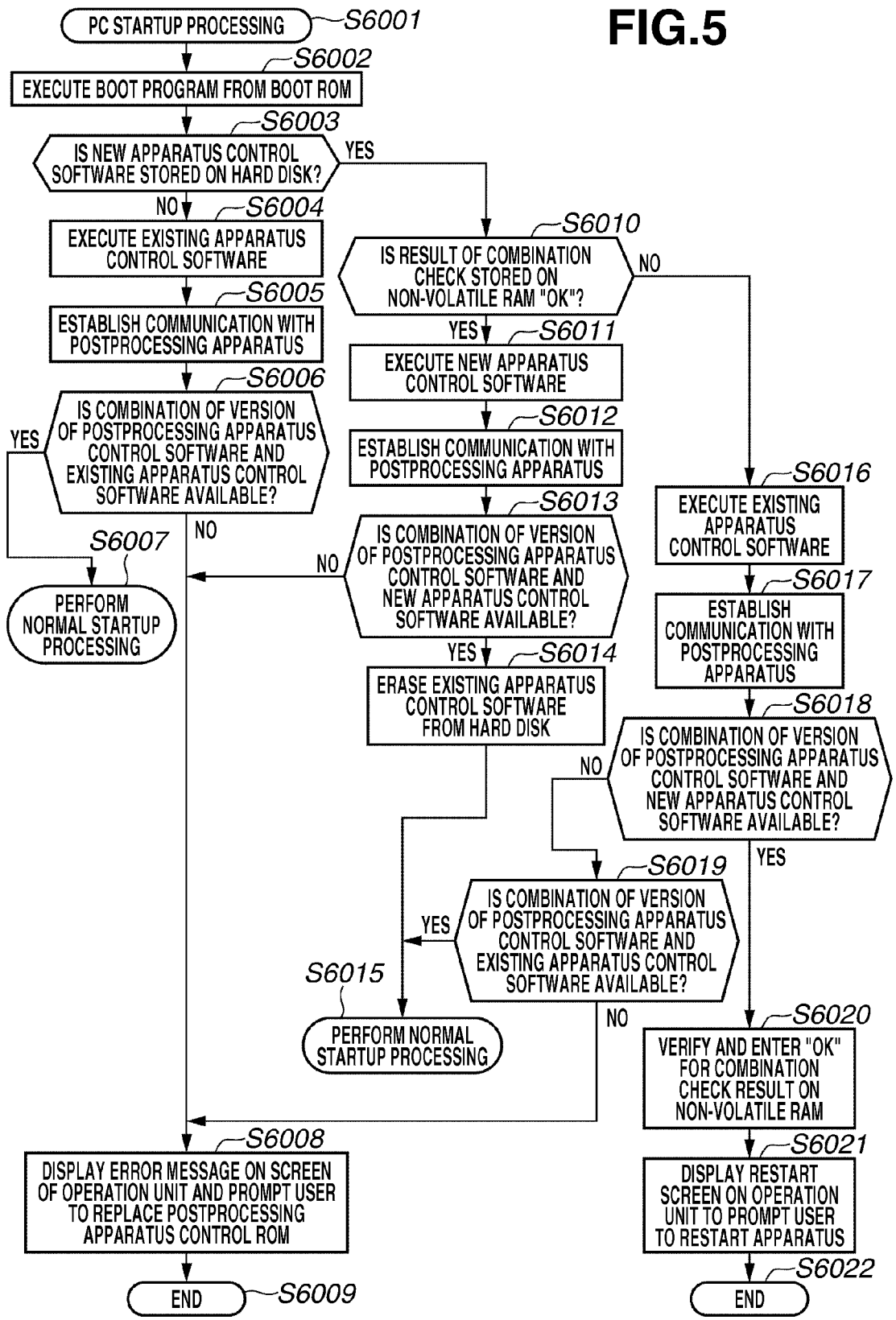
FIG. 5 is a flow chart that illustrates an example of control processing performed by the CPU of the image forming apparatus control unit according to an exemplary embodiment of the present invention.

FIG. 5 is a flow chart that illustrates an example of control processing performed by the CPU 1 of the image forming apparatus control unit 15 according to the first exemplary embodiment.

The control processing illustrated in FIG. 5 is performed when the image forming apparatus control unit 15 is powered on. Referring to FIG. 5, in step S6001, when the image forming apparatus control unit 15 is powered on (when a request for activating the image forming apparatus control unit 15 is received), the image forming apparatus control unit 15 is activated.

In step S6002, the CPU 1 of the image forming apparatus control unit 15 reads and executes the boot program 31 from the boot ROM 3.

In step S6003, the CPU 1, on which the boot program 31 operates, checks whether new apparatus main unit control software is stored on the HDD 400.

Note that in the present exemplary embodiment as described below, simply the boot program 31 performs the processing for the sake of convenience of description.

In the example illustrated in FIG. 3, the boot program 31 checks whether the new apparatus main unit control software ver. 11.0 (the new apparatus main unit control software 420) is stored on the HDD 400. If it is determined in step S6003 that the new apparatus main unit control software is stored on the HDD 400 (YES in step S6003), then the processing advances to step S6010. On the other hand, if it is determined in step S6003 that the new apparatus main unit control software is not stored on the HDD 400 (NO in step S6003), then the processing advances to step S6004.

In step S6004, the boot program 31 activates the existing apparatus main unit control software (in the example illustrated in FIG. 3, the existing apparatus main unit control software ver. 10.0 (the existing apparatus main unit control software 410)) because it is verified as a result of the determination in step S6003 that the new apparatus main unit control software has not been stored on the HDD 400.

After performing the processing in step S6004, the CPU 1 performs the processing according to the existing apparatus main unit control software ver. 10.0 (the existing apparatus main unit control software 410).

Note that in the present exemplary embodiment as described below, simply the existing apparatus main unit control software performs the processing for the sake of convenience of description. This can also apply to the description with respect to the new apparatus main unit control software.

As described above, the boot program 31 cannot control the printer controller 20. Accordingly, the boot program 31 cannot communicate with the post-processing apparatus control unit 310. Meanwhile, the existing apparatus main unit control software can control the printer controller 20. Accordingly, the existing apparatus main unit control software can communicate with the post-processing apparatus control unit 310.

In step S6005, the existing apparatus main unit control software establishes a communication with the post-processing apparatus control unit 310 via the printer controller 20.

In step S6006, the combination appropriateness determination unit 417 of the existing apparatus main unit control software compares the version of the post-processing apparatus control software to which the currently operating existing apparatus main unit control software can be applied with the post-processing apparatus control software version 341 stored on the post-processing apparatus ROM 340.

More specifically, in step S6006, the combination appropriateness determination unit 417 of the existing apparatus main unit control software checks whether the combination is appropriate. If it is determined in step S6006 that the combination is appropriate (YES in step S6006), then the processing advances to step S6007. On the other hand, if it is determined in step S6006 that the combination is not appropriate (NO is step S6006), then the processing advances to step S6008.

In step S6007, the existing apparatus main unit control software performs normal activation processing, displays the screen illustrated in FIG. 2 on the screen of the operation unit 650, and waits until a user instruction is input.

More specifically, the processing advances from step S6006 to step S6007 if any new apparatus main unit control software is not extracted as a result of the check and if it is determined that the combination of the version of the apparatus main unit control software and the post-processing apparatus control software version is appropriate.

In the case where the processing advances to step S6008, the existing apparatus main unit control software has recognized by the determination in step S6006 that the combination of the version of the existing apparatus main unit control software and the post-processing apparatus control software version is not appropriate, as described above.

Accordingly, in step S6008, the existing apparatus main unit control software displays an error message display screen 70001 on the operation unit 650 (performs error message display screen display processing (FIG. 6)). Here, the error message display screen 70001 displays a message for prompting the user to replace the post-processing apparatus control ROM 340, on which the post-processing apparatus control software has been stored, with an appropriate ROM.

FIG. 6 illustrates an example of the error message display screen 70001 according to the present exemplary embodiment. In step S6009 (FIG. 5), after performing the display of the error message display screen 70001 on the operation unit 650, the existing apparatus main unit control software ends the processing, recognizing that it is likely that the user replaces the post-processing apparatus control ROM 340 with an appropriate ROM.

More specifically, the processing advances from step S6006 to step S6008 if the new apparatus main unit control software has not been transferred from the PC/WS 30 and if the image forming apparatus is activated after the post-processing apparatus control ROM 340 is replaced with an inappropriate ROM.

In the case where the processing advances from step S6003 to step S6010 (YES in step s6003), the boot program 31 has recognized in step S6003 that the new apparatus main unit control software (in the example illustrated in FIG. 3, the new apparatus main unit control software ver. 11.0 (the new apparatus main unit control software 420)) exists on the HDD 400.

Therefore, in step S6010, the boot program 31 accesses the non-volatile RAM 80 to determine whether the content of the combination check result 81 indicates "OK".

If it is determined in step S6010 that the content of the combination check result 81 indicates "OK" (YES in step S6010), then the processing advances to step S6011. On the other hand, if it is determined in step S6010 that the content of the combination check result 81 indicates "NG" (NO in step S6010), then the processing advances to step S6016.

In the case where the processing advances to step S6011, the boot program 31 has recognized in step S6010 that the content of the combination check result 81 indicates "OK", as described above.

Therefore, the boot program 31 can determine that the combination of the apparatus main unit control software and the post-processing apparatus control software has been appropriate at the time of the transfer of the new apparatus main unit control software from the PC/WS 30.

Accordingly, in step S6011, the boot program 31 activates the new apparatus main unit control software among the apparatus main unit control software stored on the HDD 400, instead of activating the new apparatus main unit control software.

In step S6012, the new apparatus main unit control software establishes a communication with the post-processing apparatus control unit 310 via the printer controller 20.

In step S6013, a combination appropriateness determination unit 427 (FIG. 3) of the new apparatus main unit control software 420 compares the version of the post-processing apparatus control software to which the currently operating new apparatus main unit control software can be applied with the post-processing apparatus control software version 341 stored on the post-processing apparatus ROM 340 (performs post-activation combination appropriateness determination processing). Thus, the combination determination unit 427 checks whether the combination is appropriate.

If it is determined by the combination determination unit 427 of the new apparatus main unit control software in step S6013 that the combination is appropriate (YES in step S6013), then the processing advances to step S6014. On the other hand, if it is determined by the combination determination unit 427 of the new apparatus main unit control software in step S6013 that the combination is not appropriate (NO in step S6013), then the processing advances to step S6008.

In step S6008, the new apparatus main unit control software displays, on the operation unit 650, the error message display screen 70001 (FIG. 6) that prompts the user to replace the post-processing apparatus control ROM 340, which stores the post-processing apparatus control software, with an appropriate ROM.

In step S6009, the new apparatus main unit control software ends the processing, recognizing that it is likely that the user replaces the post-processing apparatus control ROM 340 with the appropriate ROM.

In this case, the above-described processing is performed if the version of the new apparatus main unit control software whose combination with the post-processing apparatus control software is appropriate has been transferred from the PC/WS 30 to be stored on the HDD 400. However, the version of the post-processing apparatus control software has been changed to a version that is inappropriate with respect to the combination with the version of the new apparatus main unit control software after the image forming apparatus has been powered off, and the changed version of the post-processing apparatus control software is activated.

In step S6014, the new apparatus main unit control software erases, from the HDD 400, the existing apparatus main unit control software (in the example illustrated in FIG. 3, the existing apparatus main unit control software ver. 10.0 (the existing apparatus main unit control software 410)), which now may be unnecessary.

In step S6015, the new apparatus main unit control software executes normal activation processing, displays the screen illustrated in FIG. 2 on the operation unit 650, and waits until a user instruction is input.

More specifically, the above-described processing is performed if it is determined that new apparatus main unit control software has been stored on the HDD 400 and in the case where the existing apparatus main unit control software is erased based on a result of the determination such that the combination of the version of the new apparatus main unit control software and the version of the post-processing apparatus control software is appropriate and thus the new apparatus main unit control software performs the activation processing.

In the case where the processing advances to step S6016, the boot program 31 has recognized that the content of the combination check result 81 stored in the non-volatile RAM 80 is "NG" as a result of the determination in step S6010.

Accordingly, the boot program 31 has further recognized that the combination of the version of the apparatus main unit control software and the version of the post-processing apparatus control software has been inappropriate at the time of the transfer of the new apparatus main unit control software from the PC/WS 30. Therefore, in step S6016, the boot program 31 activates the existing apparatus main unit control software among the apparatus main unit control software stored on the HDD 400, instead of the new apparatus main unit control software.

In step S6017, the existing apparatus main unit control software establishes a communication with the post-processing apparatus control unit 310 via the printer controller 20.

In step S6018, the combination appropriateness determination unit 417 compares the post-processing apparatus control software version 425 to which the new apparatus main unit control software 420 can be applied with the post-processing apparatus control software version 341 stored on the post-processing apparatus ROM 340 (performs the post-activation combination appropriateness determination processing). Thus, the combination appropriateness determination unit 417 of the existing apparatus main unit control software checks whether the combination is appropriate.

If it is determined in step S6018 that the combination is appropriate (YES in step S6018), then the processing advances to step S6020. On the other hand, if it is determined in step S6018 that the combination is not appropriate (NO in step S6018), then the processing advances to step S6019.

In step S6019, the combination appropriateness determination unit 417 of the existing apparatus main unit control software compares the version of the post-processing apparatus control software to which the existing apparatus main unit control software can be applied with the post-processing apparatus control software version 341 stored on the post-processing apparatus ROM 340. Thus, the combination appropriateness determination unit 417 of the existing apparatus main unit control software checks whether the combination is appropriate.

If it is determined by the combination appropriateness determination unit 417 of the existing apparatus main unit control software in step S6019 that the combination is appropriate (YES in step S6019), then the processing advances to step S6015.

In step S6015, the existing apparatus main unit control software executes normal activation processing, displays the screen illustrated in FIG. 2 on the operation unit 650, and waits for a user instruction.

More specifically, the above-described processing is performed in the case where it is determined that the combination of the version of the new apparatus main unit control software and the version of the post-processing apparatus control software is inappropriate at the time of the transfer of the new apparatus main unit control software from the PC/WS 30 and where the existing apparatus main unit control software has been activated.

On the other hand, if it is determined by the combination appropriateness determination unit 417 of the existing apparatus main unit control software in step S6019 that the combination is not appropriate (NO in step S6019), then the processing advance to step S6008.

In the case where the processing advances to step S6008, the existing apparatus main unit control software has recognized as a result of the determination in step S6019 that the combination of the version of the existing apparatus main unit control software and the version of the post-processing apparatus control software is not appropriate.

Accordingly, the existing apparatus main unit control software displays, on the operation unit 650, the error message display screen 70001 (FIG. 6) that prompts the user to replace the post-processing apparatus ROM 340, which stores the post-processing apparatus control software, with an appropriate ROM.

In this case, it is determined that the combination of the version of the new apparatus main unit control software and the version of the post-processing apparatus control software is inappropriate at the time of the transfer of the new apparatus main unit control software from the PC/WS 30. Furthermore, the version of the post-processing apparatus control software has been changed to a version that is inappropriate with respect to the combination with the existing apparatus main unit control software after the image forming apparatus has been powered off, and the changed version of the post-processing apparatus control software is activated.

In the case where the processing advances to step S6020, the existing apparatus main unit control software has recognized as a result of the determination in step S6018 that the combination of the version of the new apparatus main unit control software stored on the HDD 400 and the version of the post-processing apparatus control software stored on the post-processing apparatus ROM 340 is appropriate. Accordingly, the existing apparatus main unit control software changes the combination check result 81 stored on the non-volatile RAM 80 from "NG" to "OK" (determination result changing processing).

In step S6021, the existing apparatus main unit control software displays a restart prompting screen 80001 (FIG. 7) (performs screen display processing) on the operation unit 650 to prompt the user to restart the image forming apparatus. FIG. 7 illustrates an example of the restart prompting screen 80001.

After displaying the restart prompting screen 80001 on the operation unit 650, the existing apparatus main unit control software ends the processing in step S6022.

More specifically, in the above case, the combination of the version of the new apparatus main unit control software and the version of the post-processing apparatus control software has been inappropriate (NG) at the time of the transfer of the new apparatus main unit control software from the PC/WS 30. However, the post-processing apparatus control ROM 340 has been replaced with an appropriate ROM after the image forming apparatus has been powered off and thus the version of the post-processing apparatus control software has become appropriate with respect to the combination with the version of the new apparatus main unit control software.

Thus, according to the present exemplary embodiment, it is checked whether the combination of the version of the new apparatus main unit control software and the version of the post-processing apparatus control software is appropriate at the time of storage (installation) of the new apparatus main unit control software. The combination check result 81 is stored on the non-volatile RAM 80.

The boot program 31 communicates with the post-processing apparatus based on the combination check result 81. Thus, the boot program 31 can activate the appropriate version of the apparatus main unit control software when the version of the post-processing apparatus control software is not available.

That is, the present exemplary embodiment performs control so that the control programs (the control software) can operate in an appropriate combination. Accordingly, a downtime that may arise due to upgrading to a new version of the control program (control software) can be reduced as well.

A second exemplary embodiment of the present invention is described below with reference to FIGS. 8 through 10.

Figure 8:
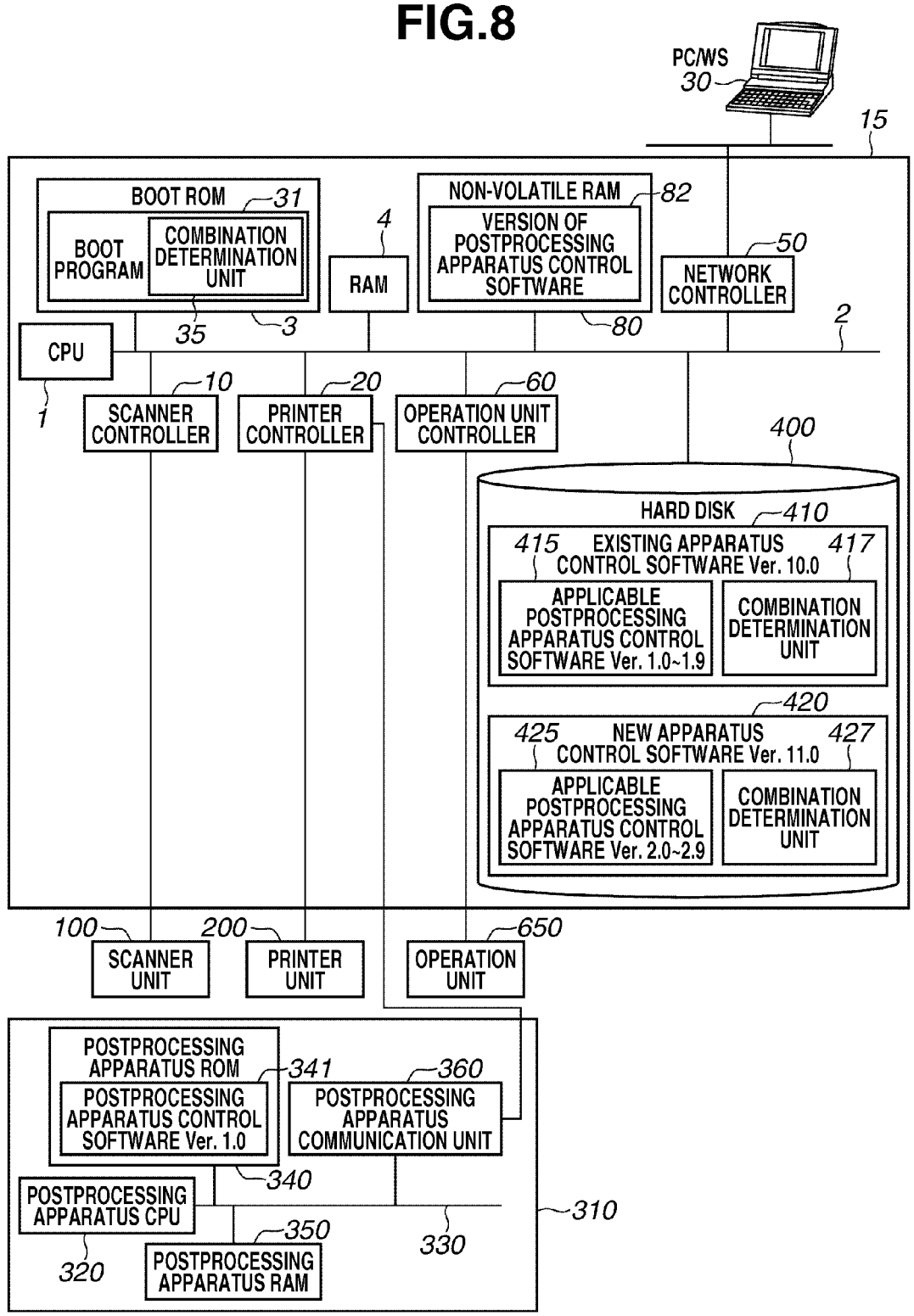
FIG. 8 illustrates an exemplary configuration of an image forming apparatus control unit and a post-processing apparatus control unit according to an exemplary embodiment of the present invention.

FIG. 8 illustrates an exemplary configuration of the image forming apparatus main unit control unit 15 and the post-processing apparatus control unit 310 according to the second exemplary embodiment. The configuration according to the present exemplary embodiment illustrated in FIG. 8 is substantially similar to the configuration according to the first exemplary embodiment, except that the boot program 31 includes a combination appropriateness determination unit 35 within an activation program 31, and a content to be stored on the non-volatile RAM 80 is different from that in the first exemplary embodiment.

In the first exemplary embodiment, the image forming apparatus performs the determination as to the appropriateness of the combination of the version of the post-processing apparatus control software to which the new apparatus main unit control software can be applied and the post-processing apparatus control software version 341 stored on the post-processing apparatus control ROM 340 at the time of the transfer of the new apparatus main unit control software from the PC/WS 30. Further, the image forming apparatus stores the result of the determination (the combination check result 81) on the non-volatile RAM 80.

However, in second exemplary embodiment, the image forming apparatus stores the post-processing apparatus control software version 341 on the non-volatile RAM 80 at the time of the transfer of the new apparatus main unit control software from the PC/WS 30 (a post-processing apparatus control software version 82).

Now, processing for activating the image forming apparatus control unit 15 according to the present exemplary embodiment will be described below. At the start of the processing, when the image forming apparatus control unit 15 is powered on, the CPU 1 loads and executes the boot program 31 from the boot ROM 3.

The boot ROM 3 may have a limited and relatively small capacity. Accordingly, the boot ROM 3 may not hold many multiple function programs. Accordingly, the control over the scanner controller 10, the printer controller 20, the network controller 50, and the operation unit controller 60 can be performed by the apparatus main unit control software, which is stored on the HDD 400.

The boot program 31 may perform only minimum processing that may be necessary such as processing for activating the appropriate main unit control software stored on the HDD 400. Thus, the size of the program to be stored on the boot program 31 can be reduced.

The boot program 31, which may have a limited capacity, can load data and information stored on the non-volatile RAM 80 but may not be capable of initializing the printer controller 20 to control the post-processing apparatus control unit 310.

The processing for initializing the printer controller 20 to communicate with and control the post-processing apparatus control unit 310 can be performed by the apparatus main unit control software stored on the HDD 400.

The HDD 400 can store a plurality of apparatus main unit control software. In the example illustrated in FIG. 8, the existing apparatus main unit control software 410 and the new apparatus main unit control software 420 are stored on the HDD 400.

Each of the existing apparatus main unit control software 410 and the new apparatus main unit control software 420 can have its own version. More specifically, in the present exemplary embodiment, the version of the existing apparatus main unit control software 410 is ver. 10.0, while the version of the new apparatus main unit control software 420 is ver. 11.0.

Each of the existing apparatus main unit control software 410 and the new apparatus main unit control software 420 has a predetermined version of the post-processing apparatus control software applicable thereto (operable as a combination).

For example, the version of post-processing apparatus control software 415 applicable to the existing apparatus main unit control software ver. 10.0 (the existing apparatus main unit control software 410) may be versions from 1.0 to 1.9 (the control software 415). On the other hand, the version of post-processing apparatus control software 425 applicable to the new apparatus main unit control software ver. 11.0 (the new apparatus main unit control software 420) may versions from 2.0 to 2.9, in the present exemplary embodiment.

The boot program 31 stored on the boot ROM 3 includes the combination appropriateness determination unit 35. The combination appropriateness determination unit 35 checks the appropriateness of the combination of the post-processing apparatus control software version (version information) 82 stored on the non-volatile RAM 80 and the post-processing apparatus control software version 425 to which the new apparatus main unit control software 420 can be applied.

The combination appropriateness determination unit 35 selects one apparatus main unit control software from among a plurality of apparatus main unit control software programs stored on the HDD 400 according to a content of a combination check result. Then, the combination appropriateness determination unit 35 activates the selected apparatus main unit control software.

Figure 9:
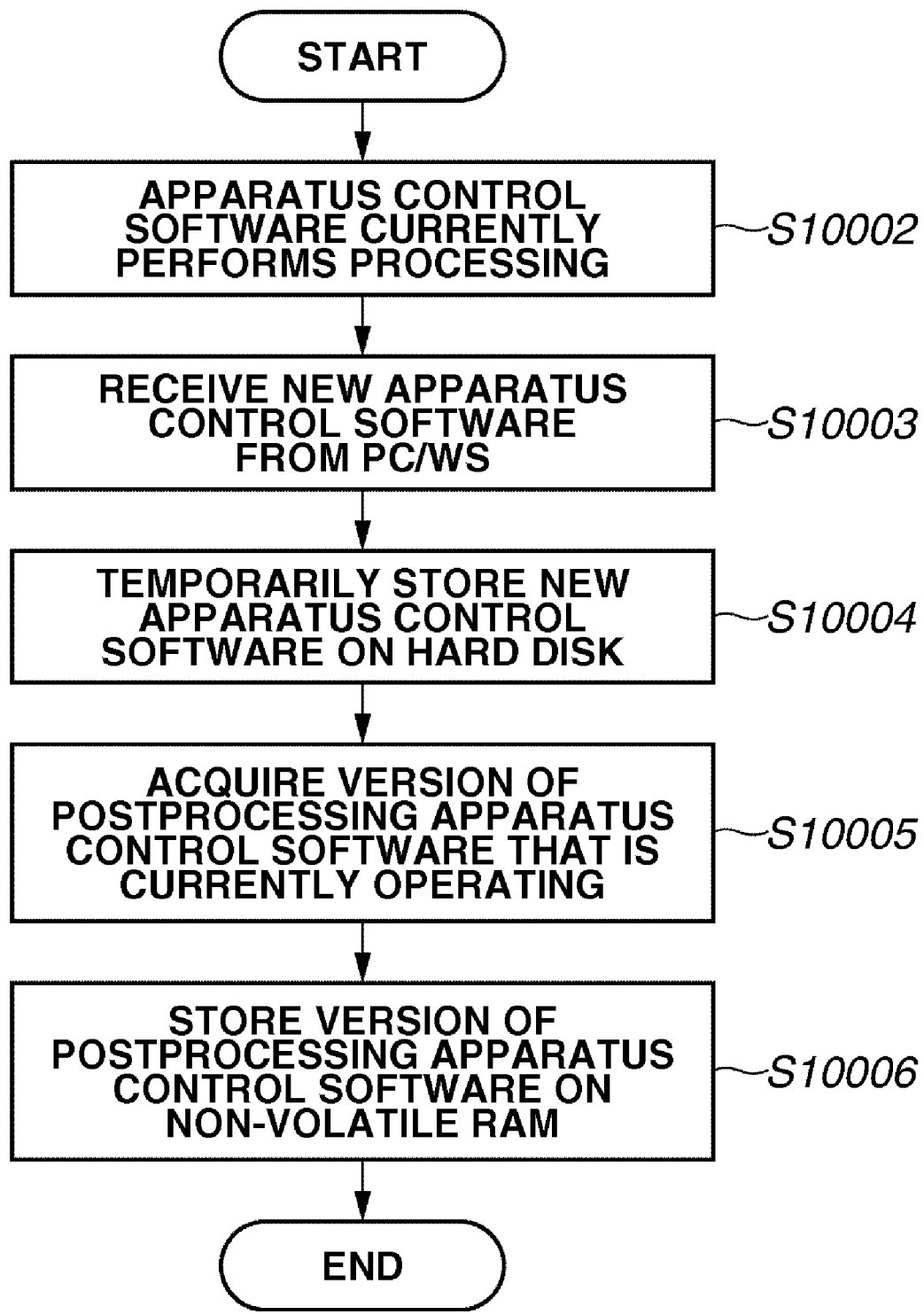
FIG. 9 is a flow chart that illustrates an example of control processing performed by a CPU of an image forming apparatus control unit according to an exemplary embodiment of the present invention.

FIG. 9 is a flow chart that illustrates an example of control processing performed by the CPU 1 of the image forming apparatus control unit 15 according to the second exemplary embodiment.

The control processing illustrated in FIG. 9 is performed when new apparatus main unit control software is transferred from the PC/WS 30 while current apparatus main unit control software is executed.

Referring to FIG. 9, in step S10002, the existing apparatus main unit control software ver. 10.0 (the existing apparatus main unit control software 410) (FIG. 8) operates on the CPU 1. That is, it is supposed that the CPU 1 currently performs processing according to the existing apparatus main unit control software ver. 10.0 (the existing apparatus main unit control software 410). The apparatus main unit control software controls the network controller 50 and the printer controller 20. Further, the apparatus main unit control software can communicate with the PC/WS 30 and the post-processing apparatus control unit 310.

In step S10003, the CPU 1 receives new apparatus main unit control software from the PC/WS 30. In step S10004, the CPU 1 stores the new apparatus main unit control software received in step S10003 on the HDD 400. In the example illustrated in FIG. 8, the new apparatus main unit control software is stored on the HDD 400 as the new apparatus main unit control software ver. 11.0 (the new apparatus main unit control software 420).

In step S10005, the CPU 1 communicates with the post-processing apparatus control unit 310 via the printer controller 20 and acquires the post-processing apparatus control software version 341 stored on the post-processing apparatus ROM 340.

In the example illustrated in FIG. 8, the post-processing apparatus control software version 341 is version 1.0.

In step S10006, the CPU 1 stores the post-processing apparatus control software version 341 acquired in step S10005 on the non-volatile RAM 80 and continues the operation of the existing apparatus main unit control software. The non-volatile RAM 80 is an example of a configuration for performing the processing for storing the version information.

Figure 10:
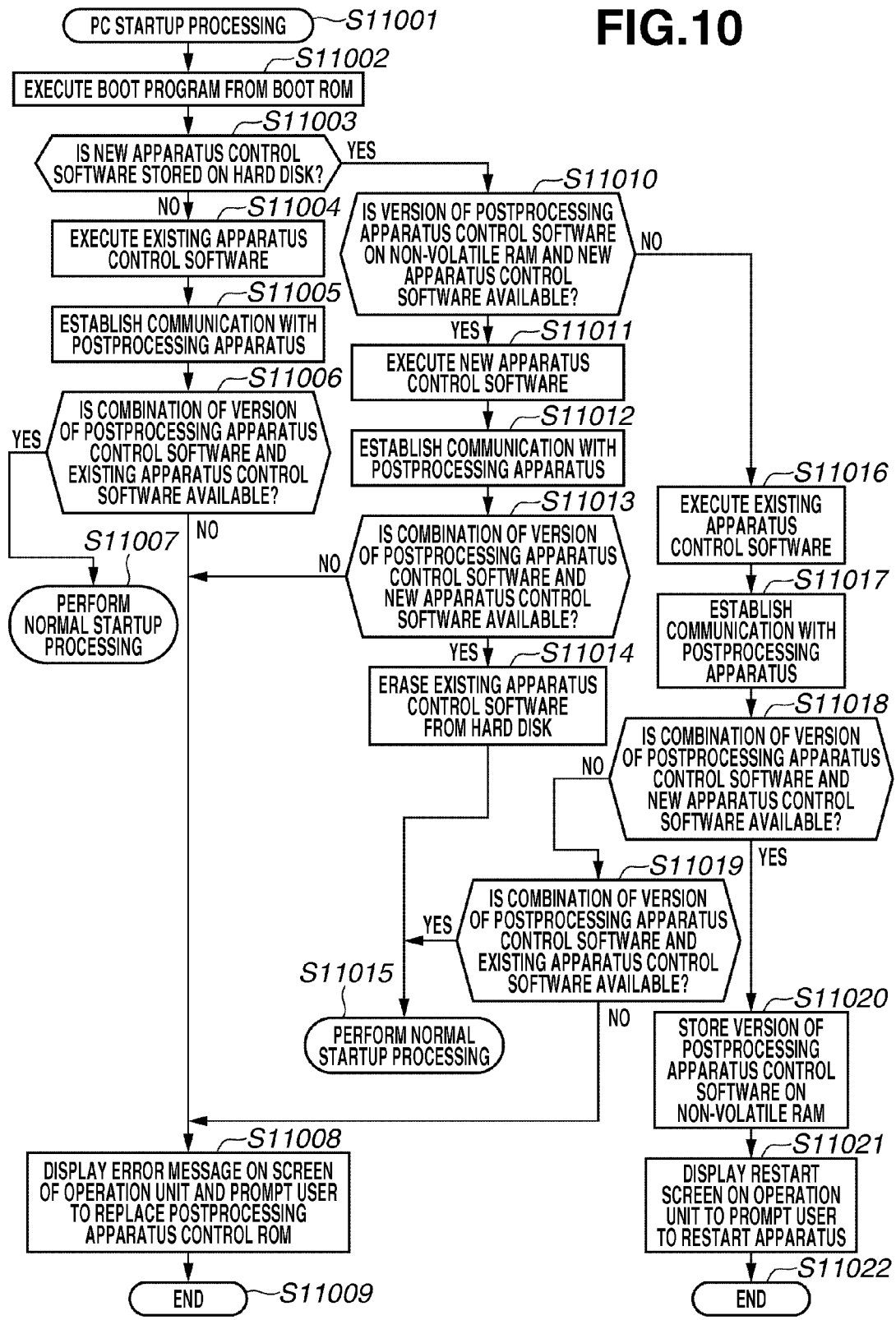
FIG. 10 is a flow chart that illustrates an example of control processing performed by the CPU of the image forming apparatus control unit according to an exemplary embodiment of the present invention.

FIG. 10 is a flow chart that illustrates an example of control processing performed by the CPU 1 of the image forming apparatus control unit 15 according to the second exemplary embodiment. The control processing illustrated in FIG. 10 may be performed when the image forming apparatus control unit 15 is powered on.

Referring to FIG. 10, in step S11001, when the image forming apparatus control unit 15 is powered on, the image forming apparatus control unit 15 is activated.

In step S11002, the CPU 1 of the image forming apparatus control unit 15 activates the boot program 31 from the boot ROM 3.

In step S11003, the CPU 1, on which the boot program 31 operates, checks whether new apparatus main unit control software is stored on the HDD 400. In the present exemplary embodiment as described below, for the sake of convenience of description, the boot program 31 may simply perform the processing.

In the example illustrated in FIG. 8, the boot program 31 checks whether the new apparatus main unit control software ver. 11.0 (the new apparatus main unit control software 420) has been stored on the HDD 400. If it is determined in step S11003 that the new apparatus main unit control software has been stored on the HDD 400 (YES in step S11003), then the processing advances to step S11010. On the other hand, if it is determined in step S11003 that the new apparatus main unit control software has not been stored on the HDD 400 (NO in step S11003), then the processing advances to step S11004.

In step S11004, the boot program 31 activates the existing apparatus main unit control software (in the example illustrated in FIG. 8, the existing apparatus main unit control software ver. 10.0 (the existing apparatus main unit control software 410)) because it is verified as a result of the determination in step S11003 that the new apparatus main unit control software has not been stored on the HDD 400. After performing the processing in step S11004, the CPU 1 performs the processing according to the existing apparatus main unit control software ver. 10.0 (the existing apparatus main unit control software 410).

In the present exemplary embodiment as described below, for the sake of convenience of description, simply the existing apparatus main unit control software performs the processing. The same applies to the new apparatus main unit control software.

As described above, the boot program 31 cannot control the printer controller 20. Accordingly, the boot program 31 cannot communicate with the post-processing apparatus control unit 310. Meanwhile, the existing apparatus main unit control software can control the printer controller 20. Accordingly, the existing apparatus main unit control software can communicate with the post-processing apparatus control unit 310.

In step S11005, the existing apparatus main unit control software establishes communication with the post-processing apparatus control unit 310 via the printer controller 20.

In step S11006, the combination appropriateness determination unit 417 of the existing apparatus main unit control software compares the version of the post-processing apparatus control software to which the currently operating existing apparatus main unit control software can be applied with the post-processing apparatus control software version 341 stored on the post-processing apparatus ROM 340.

More specifically, in step S11006, the combination appropriateness determination unit 417 of the existing apparatus main unit control software checks whether the combination is appropriate. If it is determined in step S11006 that the combination is appropriate (YES in step S11006), then the processing advances to step S11007. On the other hand, if it is determined in step S11006 that the combination is not appropriate (NO in step S11006), then the processing advances to step S11008.

In step S11007, the existing apparatus main unit control software performs normal activation processing, displays the screen illustrated in FIG. 2 on the screen of the operation unit 650, and waits until a user instruction is input.

More specifically, the processing advances from step S11006 to step S11007 if any new apparatus main unit control software is not extracted as a result of the check and if it is determined that the combination of the version of the apparatus main unit control software and the post-processing apparatus control software version is appropriate.

In the case where the processing advances to step S11008, the existing apparatus main unit control software has recognized by the determination in step S11006 that the combination of the version of the existing apparatus main unit control software and the post-processing apparatus control software version is not appropriate (NO in step S11006), as described above.

Accordingly, in step 11008, the existing apparatus main unit control software displays an error message display screen on the operation unit 650. The error message display screen displays a message for prompting the user to replace the post-processing apparatus control ROM 340, on which the post-processing apparatus control software has been stored, with an appropriate ROM.

In step S11009, after displaying the error message display screen on the operation unit 650, the existing apparatus main unit control software ends the processing, recognizing that it is likely that the user replaces the post-processing apparatus control ROM 340 with an appropriate ROM.

More specifically, the processing advances from step S11006 to step S11008 if the new apparatus main unit control software has not been transferred from the PC/WS 30 and if the image forming apparatus is activated after the post-processing apparatus control ROM 340 is replaced with an inappropriate ROM.

In the case where the processing advances from step S11003 to step S11010, the boot program 31 has recognized in step S11003 that the new apparatus main unit control software (in the example illustrated in FIG. 8, the new apparatus main unit control software ver. 11.0 (the new apparatus main unit control software 420)) exists on the HDD 400.

Therefore, in step S11010, the combination appropriateness determination unit 35 of the boot program 31 accesses the non-volatile RAM 80 to acquire the post-processing apparatus control software version 82.

Then, the combination appropriateness determination unit 35 of the boot program 31 compares the post-processing apparatus control software version 82 and the post-processing apparatus control software version 425 to which the new apparatus main unit control software ver. 11.0 (the new apparatus main unit control software 420) can be applied.

The combination appropriateness determination unit 35 of the boot program 31 checks whether the combination is appropriate by performing the above-described comparison. If it is determined in step S11010 that the combination is appropriate (YES in step S11010), then the processing advances to step S11011. On the other hand, if it is determined in step S11010 that the combination is not appropriate (NO in step S11010), then the processing advances to step S11016.

In the case where the processing advances to step S11011, the boot program 31 has recognized in step S11010 that the combination of the version of the post-processing apparatus control software and the version of the new apparatus main unit control software is appropriate, as described above. Accordingly, in step S11011, the boot program 31 activates the new apparatus main unit control software among the apparatus main unit control software stored on the HDD 400, instead of activating the existing apparatus main unit control software.

In step S11012, the new apparatus main unit control software establishes a communication with the post-processing apparatus control unit 310 via the printer controller 20.

In step S11013, the combination appropriateness determination unit 427 of the new apparatus main unit control software 420 compares the version of the post-processing apparatus control software to which the currently operating new apparatus main unit control software can be applied with the post-processing apparatus control software version 341 stored on the post-processing apparatus ROM 340 (performs post-activation combination appropriateness determination processing). Thus, the combination determination unit 427 checks whether the combination is appropriate.

If it is determined by the combination determination unit 427 of the new apparatus main unit control software in step S11013 that the combination is appropriate (YES in step S11013), then the processing advances to step S11014.

On the other hand, if it is determined by the combination determination unit 427 that the combination is not appropriate (NO in step S11013), then the processing advances to step S11008.

In step S11008, the new apparatus main unit control software displays on the operation unit 650 the error message display screen that prompts the user to replace the post-processing apparatus control ROM 340, which stores the post-processing apparatus control software, with an appropriate ROM.

In step S11009, the new apparatus main unit control software ends the processing, recognizing that it is likely that the user replaces the post-processing apparatus control ROM 340 with an appropriate ROM.

As described above, the processing advances from step S11003 to step S11010 and to the step S11016 in the following case. More specifically, the above-described processing is performed if the version of the new apparatus main unit control software whose combination with the post-processing apparatus control software is appropriate has been transferred from the PC/WS 30 to be stored on the HDD 400 but the version of the post-processing apparatus control software has been changed to a version that is inappropriate with respect to the combination with the version of the new apparatus main unit control software after the image forming apparatus has been powered off, and the changed version is activated.

In step S11014, the new apparatus main unit control software erases, from the HDD 400, the existing apparatus main unit control software (in the example illustrated in FIG. 8, the existing apparatus main unit control software ver. 10.0 (the existing apparatus main unit control software 410)), which now may be unnecessary.

In step S11015, the new apparatus main unit control software executes normal activation processing, displays the screen illustrated in FIG. 2 on the operation unit 650, and waits until a user instruction is input.

More specifically, the above-described processing is performed if it is determined that new apparatus main unit control software is stored on the HDD 400 and the existing apparatus main unit control software is erased based on a result of the determination since the combination of the version of the new apparatus main unit control software and the version of the post-processing apparatus control software is appropriate. In this case, the new apparatus main unit control software is activated by performing the normal activation processing.

In the case where the processing advances to step S11016, the boot program 31 has recognized that the combination is not appropriate as a result of the determination in step S11010 (NG in step S11010). Accordingly, in step S11016, the boot program 31 activates the existing apparatus main unit control software among the apparatus main unit control software stored on the HDD 400, instead of the new apparatus main unit control software.

In step S11017, the existing apparatus main unit control software establishes communication with the post-processing apparatus control unit 310 via the printer controller 20.

In step S11018, the combination appropriateness determination unit 417 compares the post-processing apparatus control software version 425 to which the new apparatus main unit control software 420 can be applied with the post-processing apparatus control software version 341 stored on the post-processing apparatus ROM 340 (performs the post-activation combination appropriateness determination processing).

Thus, the combination appropriateness determination unit 417 of the existing apparatus main unit control software checks whether the combination is appropriate. If it is determined in step S11018 that the combination is appropriate (YES in step S11018), then the processing advances to step S11020. On the other hand, if it is determined in step S6018 that the combination is not appropriate (NO in step S11018), then the processing advances to step S11019.

In step S11019, the combination appropriateness determination unit 417 of the existing apparatus main unit control software compares the version of the post-processing apparatus control software to which the existing apparatus main unit control software can be applied with the post-processing apparatus control software version 341 stored on the post-processing apparatus ROM 340. Thus, the combination appropriateness determination unit 417 of the existing apparatus main unit control software checks whether the combination is appropriate.

If it is determined by the combination appropriateness determination unit 417 of the existing apparatus main unit control software in step S11019 that the combination is appropriate (YES in step S11019), then the processing advances to step S11015. In step S11015, the existing apparatus main unit control software executes normal activation processing, displays the screen illustrated in FIG. 2 on the operation unit 650, and waits for a user instruction.

More specifically, the above-described processing is performed in the case where the version of the new apparatus main unit control software that is inappropriate with respect to the combination with the post-processing apparatus control software has been transferred from the PC/WS 30 and thus the existing apparatus main unit control software is activated.

On the other hand, if it is determined by the combination appropriateness determination unit 417 in step S11019 that the combination is not appropriate (NO in step S11019), then the processing advance to step S11008.

In the case where the processing advances to step S11008, the existing apparatus main unit control software has recognized as a result of the determination in step S11019 that the combination of the version of the existing apparatus main unit control software and the version of the post-processing apparatus control software is not appropriate.

Accordingly, the existing apparatus main unit control software displays on the operation unit 650 the error message display screen that prompts the user to replace the post-processing apparatus ROM 340, which stores the post-processing apparatus control software, with an appropriate ROM.

The above-described processing is performed in the case where the version of the new apparatus main unit control software that is inappropriate with respect to the combination with the version of the post-processing apparatus control software has been transferred from the PC/WS 30. Then, the version of the post-processing apparatus control software has been changed to a version that may be inappropriate with respect to the combination with the existing apparatus main unit control software after the image forming apparatus has been powered off, and the changed version of the post-processing apparatus control software is activated.

In the case where the processing advances to step S11020, the existing apparatus main unit control software has recognized as a result of the determination in step S11018 that the combination of the version of the new apparatus main unit control software stored on the HDD 400 and the version of the post-processing apparatus control software stored on the post-processing apparatus ROM 340 is appropriate (YES in step S11018).

Therefore, the existing apparatus main unit control software stores the post-processing apparatus control software version 341 of the post-processing apparatus ROM 340 on the post-processing apparatus control software version 82 stored on the non-volatile RAM 80 (post-activation version information storage processing).

In step S11021, the existing apparatus main unit control software displays a restart prompting screen (performs screen display processing) on the operation unit 650 to prompt the user to restart the image forming apparatus.

After displaying the restart prompting screen on the operation unit 650, the existing apparatus main unit control software ends the processing in step S11022.

More specifically, the above-described processing is performed in the case where the version of the new apparatus main unit control software that is inappropriate with respect to the combination with the post-processing apparatus control software has been sent from the PC/WS 30 but the version of the post-processing apparatus control software is changed to the version that is appropriate with respect to the combination with the version of the new apparatus main unit control software after the image forming apparatus has been powered off, and the changed version is activated.

According to the present exemplary embodiment having the above-described configuration, the version of the post-processing apparatus control software is stored on the non-volatile RAM 80 at the timing of storage (installation) of the new apparatus main unit control software.

Thus, according to the present exemplary embodiment, the boot program 31 can activate an appropriate version of the apparatus main unit control software in a next activation operation according to the post-processing apparatus control software version 82 stored on the non-volatile RAM 80 even when the version of the post-processing apparatus control software stored on the post-processing apparatus ROM 340 cannot be acquired.

Accordingly, the present exemplary embodiment can perform control so that the control programs (the control software) can operate with an appropriate combination. Thus, the downtime that may arise due to upgrading of the control program, which is an example of the control software, can be reduced.

Furthermore, the present invention can also be achieved by providing a system or a device with a storage medium (or a recording medium) which stores program code of software implementing the functions of the embodiments and by reading and executing the program code stored in the storage medium with a computer of the system or the device (a CPU or an micro processing unit (MPU)).

In this case, the program code itself, which is read from the storage medium, may implement the functions of the embodiments mentioned above, and accordingly, the storage medium storing the program code constitutes the present invention.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, after the program code read from the storage medium is written in a memory provided in a function expansion board inserted in the computer or in a function expansion unit connected to the computer, a CPU and the like provided in the function expansion board or the function expansion unit can carry out a part of or the whole of the processing to implement the functions of the embodiments as described above.

In the case of implementing the present invention on a storage medium, the storage medium stores the program codes that correspond to the processing according to the flow charts illustrated in the drawings.

As described above, the exemplary embodiments of the present invention having the above-described configuration can perform control so that the control programs (the control software) can operate with an appropriate combination and thus reduce the downtime arising due to the upgrading of the control program (the control software).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-279399 filed Oct. 26, 2007, which is hereby incorporated by reference herein in its entirety.

What is claimed is:

1. An image processing apparatus comprising:
    an apparatus main unit control software storage unit configured to store new apparatus main unit control software used to control a main unit of the image processing apparatus on a non-volatile storage device;
    a combination appropriateness determination unit configured to determine whether a combination of the new apparatus main unit control software and post-processing apparatus control software that currently operates on a post-processing apparatus is appropriate based on version information about the post-processing apparatus control software used to control the post-processing apparatus, which is operable in combination with the new apparatus main unit control software, and version information about the post-processing apparatus control software that currently operates on the post-processing apparatus;
    a determination result storage unit configured to store a result of the determination by the combination appropriateness determination unit on a non-volatile storage device;
    an activation unit configured to activate the apparatus main unit control software according to the determination result stored on the non-volatile storage device after receiving an activation request;
    a first post-activation combination appropriateness determination unit configured to determine whether a combination of the new apparatus main unit control software and the post-processing apparatus control software that currently operates on the post-processing apparatus is appropriate after the existing apparatus main unit control software is activated by the activation unit;
    a determination result changing unit configured, if it is determined by the first post-activation combination appropriateness determination unit that the combination of the new apparatus main unit control software and the post-processing apparatus control software that currently operates on the post-processing apparatus is appropriate, to change the determination result stored on the non-volatile storage device to a determination result that indicates that the combination is appropriate; and
    a screen display unit configured to display a screen that prompts the user to restart the apparatus main unit control software.

2. The image processing apparatus according to claim 1, wherein the activation unit activates the new apparatus main unit control software if it is determined by the combination appropriateness determination unit that the combination is appropriate.

3. The image processing apparatus according to claim 1, wherein the activation unit activates existing apparatus main unit control software if it is determined by the combination appropriateness determination unit that the combination is not appropriate.

4. The image processing apparatus according to claim 1, further comprising:
    a second post-activation combination appropriateness determination unit configured to determine whether a combination of the new apparatus main unit control software and the post-processing apparatus control software that currently operates on the post-processing apparatus is appropriate after the new apparatus main unit control software is activated by the activation unit; and
    a deletion unit configured to delete the existing apparatus main unit control software if it is determined by the second post-activation combination appropriateness determination unit that the combination of the new apparatus main unit control software and the post-processing apparatus control software that currently operates on the post-processing apparatus is appropriate.

5. The image processing apparatus according to claim 1, further comprising:
    a second post-activation combination appropriateness determination unit configured to determine whether a combination of the new apparatus main unit control software and the post-processing apparatus control software that currently operates on the post-processing apparatus is appropriate after the new apparatus main unit control software is activated by the activation unit; and
    an error screen display unit configured to display an error screen that prompts a user to replace the storage device storing the post-processing apparatus control software with an appropriate storage device if it is determined by the second post-activation combination appropriateness determination unit that the combination of the new apparatus main unit control software and the post-processing apparatus control software that currently operates on the post-processing apparatus is not appropriate.

6. An image processing apparatus comprising:
    an apparatus main unit control software storage unit configured to store new apparatus main unit control software used to control a main unit of the image processing apparatus on a non-volatile storage device;
    a version information storage unit configured to store version information about post-processing apparatus control software that currently operates on a post-processing apparatus on a non-volatile storage device;
    an activation unit configured to determine whether a combination of the new apparatus main unit control software and the post-processing apparatus control software that currently operates on the post-processing apparatus is appropriate based on version information about the post-processing apparatus used to control the post-processing apparatus that is operable in combination with the new apparatus main unit control software and version information about the post-processing apparatus control software stored on the non-volatile storage device, after receiving an activation request, and activate the apparatus main unit control software according to a result of the determination;
    a post-activation combination appropriateness determination unit configured to determine whether a combination of the new apparatus main unit control software and the post-processing apparatus control software that currently operates on the post-processing apparatus is appropriate after the existing apparatus main unit control software is activated by the activation unit;
    a post-activation version information storage unit configured, if it is determined by the post-activation combination appropriateness determination unit that the combination of the new apparatus main unit control software and the post-processing apparatus control software that currently operates on the post-processing apparatus is appropriate, to store the version information about the post-processing apparatus on the non-volatile storage device; and
    a screen display unit configured to display a screen that prompts the user to restart the apparatus main unit control software.

7. A method for activating apparatus main unit control software used in an image processing apparatus, the method comprising:
    storing new apparatus main unit control software used to control a main unit of the image processing apparatus on a non-volatile storage device;
    determining whether a combination of the new apparatus main unit control software and post-processing apparatus control software that currently operates on a post-processing apparatus is appropriate based on version information about the post-processing apparatus control software used to control the post-processing apparatus, which is operable in combination with the new apparatus main unit control software, and version information about the post-processing apparatus control software that currently operates on the post-processing apparatus;
    storing a result of the determination on a non-volatile storage device;
    activating the apparatus main unit control software according to the determination result stored on the non-volatile storage device after receiving an activation request,
    determining whether a combination of the new apparatus main unit control software and the post-processing apparatus control software that currently operates on the post-processing apparatus is appropriate after the existing apparatus main unit control software is activated;
    changing the determination result stored on the non-volatile storage device to a determination result that indicates that the combination is appropriate if it is determined by the post-activation combination appropriateness determination unit that the combination of the new apparatus main unit control software and the post-processing apparatus control software that currently operates on the post-processing apparatus is appropriate; and
    displaying a screen that prompts the user to restart the apparatus main unit control software.

8. The method according to claim 7, wherein the new apparatus main unit control software is activated if it is determined that the combination is appropriate.

9. The method according to claim 7, wherein existing apparatus main unit control software is activated if it is determined that the combination is not appropriate.

10. The method according to claim 7, further comprising:
    determining whether a combination of the new apparatus main unit control software and the post-processing apparatus control software that currently operates on the post-processing apparatus is appropriate after the new apparatus main unit control software is activated; and erasing the existing apparatus main unit control software if it is determined that the combination of the new apparatus main unit control software and the post-processing apparatus control software that currently operates on the post-processing apparatus is appropriate.

11. The method according to claim 7, further comprising:
determining whether a combination of the new apparatus main unit control software and the post-processing apparatus control software that currently operates on the post-processing apparatus is appropriate after the new apparatus main unit control software is activated; and
displaying an error screen that prompts a user to replace the storage device storing the post-processing apparatus control software with an appropriate storage device if it is determined that the combination of the new apparatus main unit control software and the post-processing apparatus control software that currently operates on the post-processing apparatus is not appropriate.

12. A method for activating apparatus main unit control software used in an image processing apparatus, the method comprising:
storing new apparatus main unit control software used to control a main unit of the image processing apparatus on a non-volatile storage device;
storing version information about post-processing apparatus control software that currently operates on a post-processing apparatus on a non-volatile storage device;
determining whether a combination of the new apparatus main unit control software and the post-processing apparatus control software that currently operates on the post-processing apparatus is appropriate based on version information about the post-processing apparatus used to control the post-processing apparatus that is operable in combination with the new apparatus main unit control software and version information about the post-processing apparatus control software stored on the non-volatile storage device, after receiving an activation request, and activating the apparatus main unit control software according to a result of the determination;
determining whether a combination of the new apparatus main unit control software and the post-processing apparatus control software that currently operates on the post-processing apparatus is appropriate after the existing apparatus main unit control software is activated;
storing the version information about the post-processing apparatus on the non-volatile storage device if it is determined that the combination of the new apparatus main unit control software and the post-processing apparatus control software that currently operates on the post-processing apparatus is appropriate; and
displaying a screen that prompts the user to restart the apparatus main unit control software.

13. A non-transitory computer-readable storage medium storing control instructions that, when executed by an image processing apparatus, cause the image processing apparatus to perform restart operations, the computer-readable storage medium comprising:
computer-executable instructions for storing new apparatus main unit control software used to control a main unit of the image processing apparatus on a non-volatile storage device;
computer-executable instructions for determining whether a combination of the new apparatus main unit control software and post-processing apparatus control software that currently operates on a post-processing apparatus is appropriate based on version information about the post-processing apparatus control software used to control the post-processing apparatus, which is operable in combination with the new apparatus main unit control software, and version information about the post-processing apparatus control software that currently operates on the post-processing apparatus;
computer-executable instructions for storing a result of the determination on a non-volatile storage device;
computer-executable instructions for activating the apparatus main unit control software according to the determination result stored on the non-volatile storage device after receiving an activation request;
computer-executable instructions for determining whether a combination of the new apparatus main unit control software and the post-processing apparatus control software that currently operates on the post-processing apparatus is appropriate after the existing apparatus main unit control software is activated;
computer-executable instructions for changing the determination result stored on the non-volatile storage device to a determination result that indicates that the combination is appropriate if it is determined by the post-activation combination appropriateness determination unit that the combination of the new apparatus main unit control software and the post-processing apparatus control software that currently operates on the post-processing apparatus is appropriate; and
computer-executable instructions for displaying a screen that prompts the user to restart the apparatus main unit control software.

14. A non-transitory computer-readable storage medium storing control instructions that, when executed by an image processing apparatus, cause the image processing apparatus to perform restart operations, the computer-readable storage medium comprising:
computer-executable instructions for storing new apparatus main unit control software used to control a main unit of the image processing apparatus on a non-volatile storage device;
computer-executable instructions for storing version information about a post-processing apparatus control software that currently operates on a post-processing apparatus on a non-volatile storage device;
computer-executable instructions for determining whether a combination of the new apparatus main unit control software and the post-processing apparatus control software that currently operates on the post-processing apparatus is appropriate based on version information about the post-processing apparatus used to control the post-processing apparatus that is operable in combination with the new apparatus main unit control software and version information about the post-processing apparatus control software stored on the non-volatile storage device, after receiving an activation request, and activating the apparatus main unit control software according to a result of the determination;
computer-executable instructions for determining whether a combination of the new apparatus main unit control software and the post-processing apparatus control software that currently operates on the post-processing apparatus is appropriate after the existing apparatus main unit control software is activated;
computer-executable instructions for storing the version information about the post-processing apparatus on the non-volatile storage device if it is determined that the combination of the new apparatus main unit control software and the post-processing apparatus control software that currently operates on the post-processing apparatus is appropriate; and
computer-executable instructions for displaying a screen that prompts the user to restart the apparatus main unit control software.

* * * * *